(12) United States Patent
Namou et al.

(10) Patent No.: US 10,286,799 B2
(45) Date of Patent: May 14, 2019

(54) HANDS-FREE CONDUCTIVE BATTERY CHARGER FOR AN ELECTRIC VEHICLE

(71) Applicant: GM GLOBAL TECHNOLOGY OPERATIONS LLC, Detroit, MI (US)

(72) Inventors: Andrew J. Namou, West Bloomfield, MI (US); Stephen M. Cichy, Lapeer, MI (US); Kevin M. Robert, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 15/244,573

(22) Filed: Aug. 23, 2016

(65) Prior Publication Data

US 2018/0056799 A1    Mar. 1, 2018

(51) Int. Cl.
*B60L 11/18* (2006.01)
*H02J 7/00* (2006.01)

(52) U.S. Cl.
CPC ....... *B60L 11/1827* (2013.01); *B60L 11/1816* (2013.01); *B60L 11/1831* (2013.01); *B60L 11/1868* (2013.01); *H02J 7/0021* (2013.01); *B60L 2210/30* (2013.01); *B60L 2230/10* (2013.01); *Y02T 10/7005* (2013.01); *Y02T 10/7066* (2013.01); *Y02T 10/7088* (2013.01); *Y02T 90/121* (2013.01); *Y02T 90/125* (2013.01); *Y02T 90/14* (2013.01)

(58) Field of Classification Search
CPC .............. B60L 11/1827; B60L 11/1816; B60L 11/1831; B60L 11/1868; H02J 7/0021
USPC .......................................................... 320/109
See application file for complete search history.

(56) References Cited

U.S. PATENT DOCUMENTS

| | | | | |
|---|---|---|---|---|
| 3,774,050 A | * | 11/1973 | Littwin | B23Q 3/15 307/66 |
| 4,141,425 A | * | 2/1979 | Treat | B60K 16/00 180/2.2 |
| 5,184,766 A | * | 2/1993 | Takahashi | B23K 37/047 228/4.1 |
| 5,231,747 A | * | 8/1993 | Clark | B21J 15/10 227/152 |
| 5,296,997 A | * | 3/1994 | Betton | H02J 9/002 307/10.7 |
| 5,498,948 A | * | 3/1996 | Bruni | B60L 11/1816 320/108 |
| 5,541,490 A | * | 7/1996 | Sengupta | G01R 31/3624 320/160 |

(Continued)

*Primary Examiner* — Robert J Grant
*Assistant Examiner* — John T Trischler
(74) *Attorney, Agent, or Firm* — Quinn IP Law (57) ABSTRACT

A conductive charging system for use with an offboard AC or DC power supply and a plug-in vehicle includes a conductive armature, an electromagnetic relay, and a switch. The armature is connected directly to the power supply and deploys into electrical contact with the vehicle in response to the vehicle weight. The switch closes in response to the vehicle weight to connect an auxiliary power device to an inductive coil. The relay moves to a first position connecting the charge coupler to an AC-DC converter or the battery pack when the switch is open, and to a second position bypassing the charge coupler when the switch is closed. A vehicle includes the system, charge coupler, HV battery pack, auxiliary power device, and armature.

20 Claims, 4 Drawing Sheets

(56) References Cited

U.S. PATENT DOCUMENTS

| | | | | |
|---|---|---|---|---|
| 5,610,448 | A * | 3/1997 | Dattilo | H05B 37/0209 307/113 |
| 5,612,606 | A * | 3/1997 | Guimarin | B60K 1/04 104/34 |
| 5,613,814 | A * | 3/1997 | Jackson | B60P 7/13 410/69 |
| 5,745,030 | A * | 4/1998 | Aaron | B60R 25/04 280/287 |
| 5,805,068 | A * | 9/1998 | Bradus | H02J 7/0021 324/433 |
| 5,821,731 | A * | 10/1998 | Kuki | B60L 11/1805 320/108 |
| 5,850,135 | A * | 12/1998 | Kuki | B60L 11/1805 320/108 |
| 5,949,157 | A * | 9/1999 | Hirzel | H01H 3/26 307/112 |
| 6,081,205 | A * | 6/2000 | Williams | B60L 3/0069 235/381 |
| 6,208,038 | B1 * | 3/2001 | Campbell | H02J 1/00 307/18 |
| 6,307,347 | B1 * | 10/2001 | Ronning | B60L 11/1818 320/107 |
| 6,327,994 | B1 * | 12/2001 | Labrador | B01D 61/10 114/382 |
| 7,986,125 | B2 * | 7/2011 | Mitake | B60L 5/42 191/29 R |
| 7,993,155 | B2 * | 8/2011 | Heichal | B60K 1/04 180/65.1 |
| 7,999,506 | B1 * | 8/2011 | Hollar | B60L 11/1818 320/104 |
| 8,033,349 | B2 * | 10/2011 | Ortmann | B60L 11/1818 180/65.1 |
| 8,111,043 | B2 * | 2/2012 | Redmann | B60L 11/1816 320/109 |
| 8,138,718 | B2 * | 3/2012 | Dower | B60L 11/1818 320/109 |
| 8,250,343 | B2 * | 8/2012 | Chandhoke | G06F 9/5066 700/249 |
| 8,251,734 | B2 * | 8/2012 | Katagiri | B60L 11/14 439/352 |
| 8,371,405 | B2 * | 2/2013 | Ortmann | B60L 11/1818 180/65.1 |
| 8,384,344 | B1 * | 2/2013 | Rogers | H02J 7/00 180/65.21 |
| 8,454,377 | B2 * | 6/2013 | Heichal | B60K 1/04 180/65.1 |
| 8,534,400 | B2 * | 9/2013 | Stanek | B60L 7/18 180/65.265 |
| 8,541,978 | B2 * | 9/2013 | Fukuo | B60L 3/0069 320/109 |
| 8,558,504 | B2 * | 10/2013 | Brown | B60L 3/0069 320/109 |
| 8,565,930 | B2 * | 10/2013 | Miwa | B60K 6/445 141/192 |
| 8,676,378 | B2 * | 3/2014 | Tian | A47L 9/2805 15/340.1 |
| 8,786,139 | B2 * | 7/2014 | Cummings | H01L 31/02021 307/151 |
| 8,988,042 | B2 * | 3/2015 | Kamaga | B60L 11/1838 320/109 |
| 9,013,062 | B2 * | 4/2015 | Kinomura | B60L 11/12 307/44 |
| 9,033,075 | B2 * | 5/2015 | Ortmann | B60L 11/1818 180/65.1 |
| 9,153,982 | B2 * | 10/2015 | Kai | H02J 7/0042 |
| 9,197,074 | B2 * | 11/2015 | Nakamura | H02G 11/006 |
| 9,286,485 | B2 * | 3/2016 | Kotani | G06F 21/31 |
| 9,428,070 | B2 * | 8/2016 | Bell | B60L 11/1833 |
| 9,481,324 | B2 * | 11/2016 | Kaneyasu | B60R 16/00 |
| 9,555,716 | B2 * | 1/2017 | Martin | B60L 11/182 |
| 9,796,280 | B2 * | 10/2017 | McCool | B60L 11/182 |
| 9,873,347 | B2 * | 1/2018 | Brown | B60L 11/1833 |
| 9,889,755 | B2 * | 2/2018 | Frament | B60L 11/182 |
| 9,908,423 | B2 * | 3/2018 | Bell | B60L 11/182 |
| 2006/0097573 | A1 * | 5/2006 | Gidge | H04B 3/58 307/3 |
| 2006/0097574 | A1 * | 5/2006 | Gidge | H04B 3/58 307/3 |
| 2006/0145659 | A1 * | 7/2006 | Patino | H01M 10/4257 320/108 |
| 2008/0028237 | A1 * | 1/2008 | Knight | H04L 12/66 713/300 |
| 2008/0224542 | A1 * | 9/2008 | Freeman | G05B 9/02 307/66 |
| 2009/0121678 | A1 * | 5/2009 | Mitake | B60L 5/42 320/109 |
| 2010/0112843 | A1 * | 5/2010 | Heichal | B60K 1/04 439/299 |
| 2010/0230197 | A1 * | 9/2010 | Ortmann | B60L 11/1818 180/168 |
| 2010/0235006 | A1 * | 9/2010 | Brown | B60L 11/182 700/286 |
| 2010/0283426 | A1 * | 11/2010 | Redmann | B60L 11/1816 320/109 |
| 2010/0295383 | A1 * | 11/2010 | Cummings | H01L 31/02021 307/151 |
| 2010/0308768 | A1 * | 12/2010 | Dower | B60L 11/1818 320/109 |
| 2011/0022822 | A1 * | 1/2011 | Chandhoke | G06F 9/5066 712/36 |
| 2011/0121780 | A1 * | 5/2011 | Fukuo | B60L 3/0069 320/109 |
| 2011/0168462 | A1 * | 7/2011 | Stanek | B60L 7/18 180/65.1 |
| 2011/0169447 | A1 * | 7/2011 | Brown | B60L 3/0069 320/109 |
| 2011/0238260 | A1 * | 9/2011 | Kotani | G06F 21/31 701/31.4 |
| 2011/0246014 | A1 * | 10/2011 | Sauper | B60L 11/1818 701/22 |
| 2011/0300736 | A1 * | 12/2011 | Katagiri | B60L 11/14 439/347 |
| 2012/0009804 | A1 * | 1/2012 | Heichal | B60K 1/04 439/34 |
| 2012/0029750 | A1 * | 2/2012 | Ortmann | B60L 11/1818 701/22 |
| 2012/0091961 | A1 * | 4/2012 | Hani | B60L 3/0069 320/109 |
| 2012/0119575 | A1 * | 5/2012 | Kurs | B60L 3/003 307/10.1 |
| 2012/0184338 | A1 * | 7/2012 | Kesler | H02J 17/00 455/572 |
| 2012/0206100 | A1 * | 8/2012 | Brown | B60L 3/0069 320/109 |
| 2012/0217928 | A1 * | 8/2012 | Kulidjian | B60L 3/0069 320/109 |
| 2012/0235633 | A1 * | 9/2012 | Kesler | H03H 7/40 320/108 |
| 2012/0280656 | A1 * | 11/2012 | Bedell | B60L 3/0069 320/109 |
| 2012/0286730 | A1 * | 11/2012 | Bonny | B60L 11/1827 320/109 |
| 2013/0006418 | A1 * | 1/2013 | Tian | A47L 9/2805 700/245 |
| 2013/0069589 | A1 * | 3/2013 | Kai | H02J 7/0042 320/109 |
| 2013/0106351 | A1 * | 5/2013 | Nakamura | H02G 11/006 320/109 |
| 2013/0134936 | A1 * | 5/2013 | Kaneyasu | B60R 16/00 320/109 |
| 2013/0151054 | A1 * | 6/2013 | Ortmann | B60L 11/1818 701/22 |
| 2013/0180563 | A1 * | 7/2013 | Makansi | H01L 35/32 136/206 |
| 2013/0249319 | A1 * | 9/2013 | Cummings | H01L 31/02021 307/131 |
| 2013/0249470 | A1 * | 9/2013 | Martin | B60L 11/182 320/107 |

(56) References Cited

U.S. PATENT DOCUMENTS

| | | | |
|---|---|---|---|
| 2013/0257375 A1* | 10/2013 | Ang | H02J 7/022 320/109 |
| 2014/0002024 A1* | 1/2014 | Ang | H02J 7/0036 320/109 |
| 2014/0015487 A1* | 1/2014 | Brown | B60L 3/0069 320/109 |
| 2014/0021908 A1* | 1/2014 | McCool | B60L 11/182 320/108 |
| 2014/0028256 A1* | 1/2014 | Sugiyama | B60L 1/006 320/109 |
| 2014/0167691 A1* | 6/2014 | Kamaga | B60L 11/1838 320/109 |
| 2014/0232180 A1* | 8/2014 | Kinomura | B60L 11/12 307/9.1 |
| 2014/0253027 A1* | 9/2014 | Obayashi | H02J 7/025 320/108 |
| 2014/0253036 A1* | 9/2014 | Kinomura | B60L 11/123 320/109 |
| 2014/0306658 A1* | 10/2014 | Kinomura | B60L 11/1838 320/109 |
| 2014/0319916 A1* | 10/2014 | Cummings | H02J 1/102 307/53 |
| 2014/0319917 A1* | 10/2014 | Cummings | H01L 31/02021 307/63 |
| 2015/0130280 A1* | 5/2015 | O'Reilly | H02J 9/066 307/65 |
| 2015/0210174 A1* | 7/2015 | Settele | B60L 11/1818 320/109 |
| 2015/0239352 A1* | 8/2015 | Bell | B60L 11/182 320/108 |
| 2015/0303704 A1* | 10/2015 | Juan | H02J 5/005 320/108 |
| 2015/0352969 A1* | 12/2015 | Ando | B60L 11/1838 320/109 |
| 2016/0006300 A1* | 1/2016 | Grujovski | H02J 13/0093 307/64 |
| 2016/0023565 A1 | 1/2016 | Bell et al. | |
| 2016/0229301 A1* | 8/2016 | Frament | B60L 11/182 |
| 2017/0072807 A1* | 3/2017 | Matsumoto | H02J 7/0055 |
| 2017/0136899 A1* | 5/2017 | Mashinsky | B60L 11/182 |
| 2017/0237287 A1* | 8/2017 | Dolinski | H02J 9/066 307/115 |
| 2018/0015833 A1* | 1/2018 | Namou | B60L 11/182 |
| 2018/0141445 A1* | 5/2018 | Bell | B60L 11/1829 |
| 2018/0170200 A1* | 6/2018 | Brown | B60L 11/1833 |

* cited by examiner

HANDS-FREE CONDUCTIVE BATTERY CHARGER FOR AN ELECTRIC VEHICLE

TECHNICAL FIELD

The present disclosure relates to an automatic or "hands-free" conductive battery charger for an electric vehicle.

BACKGROUND

An electric vehicle powertrain typically includes one or more high-voltage alternating current (AC) electric machines, each of which is powered by a high-voltage battery pack. A power inverter module receives a direct current (DC) voltage from the battery pack and generates an AC output voltage suitable for powering the electric machines. Recharging of the battery pack may be achieved in "plug-in" electric vehicles by connecting an onboard charge coupler to an offboard AC or DC power supply, such as an available wall outlet or charging station.

When the power supply is AC, an AC-DC converter is used in a plug-in vehicle to convert an AC charging voltage into a DC voltage suitable for use by the battery pack or other DC devices. The AC-DC converter may include a passive diode bridge and actively-controlled semiconductor switches which collectively eliminate negative cycles of the AC charging voltage waveform, with the resultant voltage output thereafter filtered to provide the required DC voltage. In a DC fast-charging system, a DC power supply is used in lieu of the AC power supply, and thus the AC-DC converter is eliminated from the charging circuit in favor of a junction box.

While the plug-in charging process is controlled automatically via an onboard controller once the vehicle has been electrically connected to the offboard power supply, a typical battery charging operation requires an operator to manually connect a charging cable from the offboard power supply into the charge coupler and thereafter initiate the charging process. Other approaches for charging the battery pack include inductive charging systems and the use of charging robots. However, such alternatives may be less than optimal in terms of the required infrastructure, vehicle weight, cost, and electromagnetic compatibility and electromagnetic interference interoperability with household or other electronic devices.

SUMMARY

Disclosed herein is a hands-free conductive charging system and methodology that can be used in conjunction with an offboard AC or DC power supply to charge a high-voltage battery pack in a plug-in vehicle or other mobile platform. To be suitable for use with an AC power supply in particular, the vehicle may include an AC-DC power converter, e.g., an onboard charging module or high-voltage battery charger. For an optional DC fast-charging embodiment, the vehicle may include a junction box in place of the AC-DC power converter, or DC power from an offboard DC power supply may be delivered directly to the battery pack.

In general, the present approach uses a conductive charging armature that automatically deploys in response to contact with a road wheel or the weight of the vehicle, such as when the vehicle enters a garage or other designed charging area. The armature retracts in response to rolling contact in the opposite direction or removal of the vehicle weight, such as when the vehicle is shifted into reverse and exits the garage. The weight of the vehicle thus provides a threshold force required for deploying and actuating the conductive armature, thereby preventing inadvertent deployment of the armature.

The armature includes a charging end having suitable conductive structure, e.g., a conductive pad or set of charging pins. When the conductive structure of the armature aligns with and contacts similar structure located on the underside or other accessible portion of the vehicle, a charging circuit is activated aboard the vehicle to enable power from the offboard power supply to bypass the charge coupler. Depending on whether AC or DC charging is used, the supplied power reaches the AC-DC converter or the DC voltage bus/HV battery pack directly.

In an example embodiment, a conductive charging system is disclosed for use with a vehicle having an AC charge coupler, a high-voltage direct current (HVDC) battery pack, an auxiliary power device, and an AC-DC converter connected between the AC charge coupler and the HV battery pack. The system in this particular embodiment includes a conductive armature having charging and non-charging ends. The charging end is electrically connected to the AC power supply and is operable for deploying into direct electrical contact with a conductive pad located on the vehicle, doing so in response to a threshold force acting on the non-charging end.

The system also includes a spring-loaded or other suitable first switch, e.g., a motorized, mechanical, micro, solid-state, Hall effect, and/or optical switch, and an electromagnetic relay having an inductive coil. The first switch, which is positioned between the auxiliary power device and the inductive coil, closes in response to the threshold force, which in turn is provided by the weight of the vehicle. Closing of the switch electrically connects the auxiliary power device to the inductive coil to activate or move a second switch of the electromagnetic relay.

The second switch of the electromagnetic relay is binary, i.e., can achieve a first or second position depending on whether the inductive coil is energized. The first position connects the AC-DC converter to the power supply via the charge coupler when the inductive coil is not energized. When the inductive coil is energized, the second switch directly is activated to connect the AC-DC converter or a junction box to the power supply, depending on whether AC or DC is used, thereby bypassing the charge coupler. Transition from the first position to the second position occurs via a threshold inductance across the inductive coil. The threshold inductance is generated via a series connection with the auxiliary battery whenever the first switch is closed.

A vehicle is also disclosed that includes a charge coupler, the battery pack, the auxiliary power device, and the conductive charging system having the conductive armature described above. The offboard power supply may be AC or DC, with the relay and switch bypassing the charge coupler, with the AC-DC converter noted above eliminated in the DC embodiment in favor of a junction box.

The above features and advantages and other features and advantages of the present disclosure are readily apparent from the following detailed description of the best modes for carrying out the disclosure when taken in connection with the accompanying drawings.

DETAILED DESCRIPTION

Figures 1, 1A:
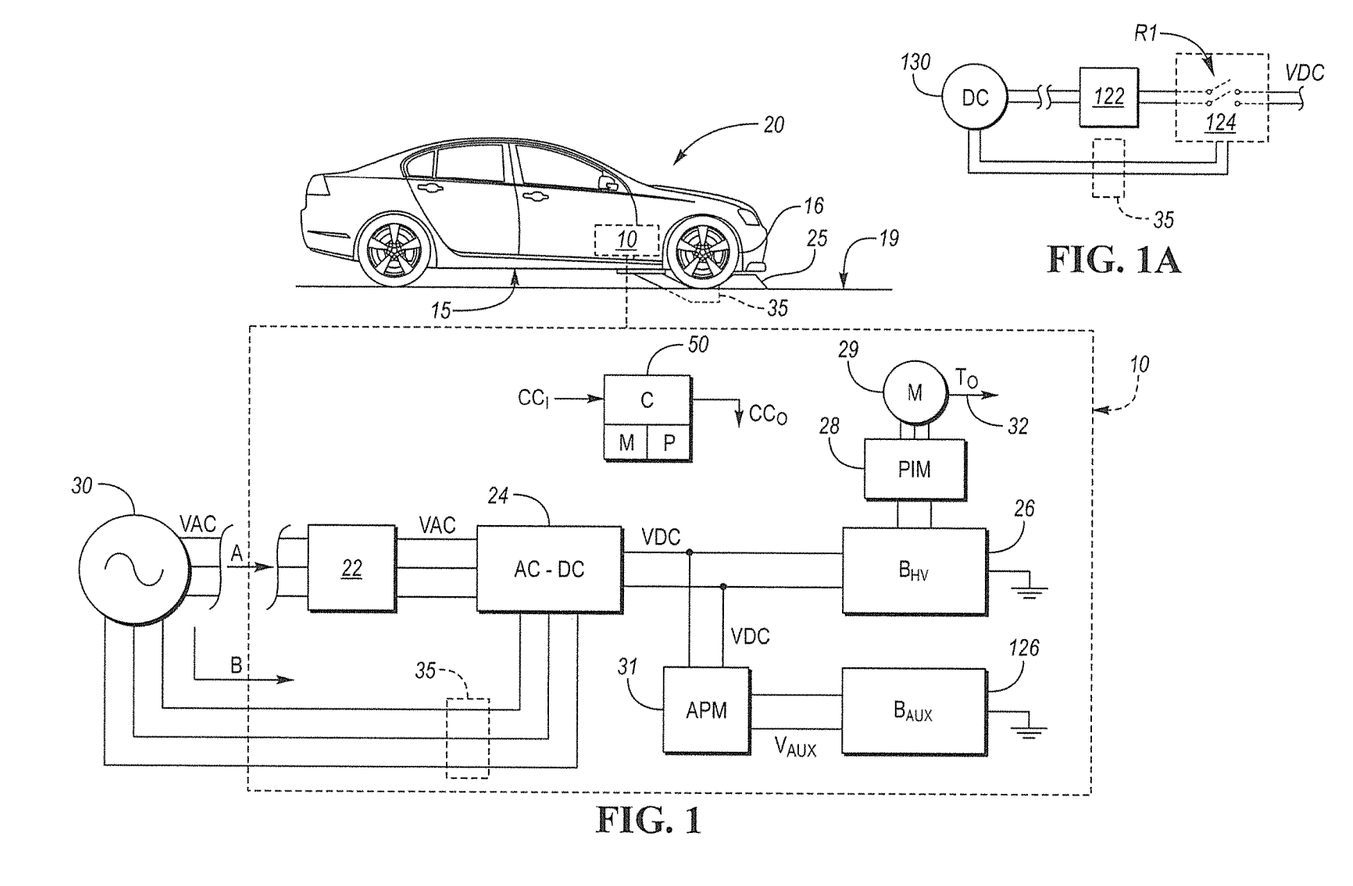
FIG. 1 is a schematic illustration of a conductive charging system usable with a plug-in vehicle and an offboard alternating current power supply.
FIG. 1A is a schematic illustration of an alternative direct current fast-charging embodiment of the conductive charging system shown in FIG. 1.

Referring to the drawings, wherein like reference numbers refer to the same or like components in the several Figures, a conductive charging system 10 is shown schematically in FIG. 1. The system 10 may be used with a plug-in vehicle 20 having a high-voltage battery pack ($B_{HV}$) 26, e.g., a multi-cell lithium ion, zinc-air, nickel-metal hydride, or lead acid direct current (DC) battery pack, that can be selectively recharged using an offboard power supply 30 when the vehicle 20 is not running. The battery pack 26 may also be recharged during ongoing operation of the vehicle 20, for instance via the process of regenerative braking. The offboard power supply 30 may be embodied as an alternating current (AC) power supply as shown in FIG. 1, or as a DC power supply 130 as shown in FIG. 1A.

Figure 2:
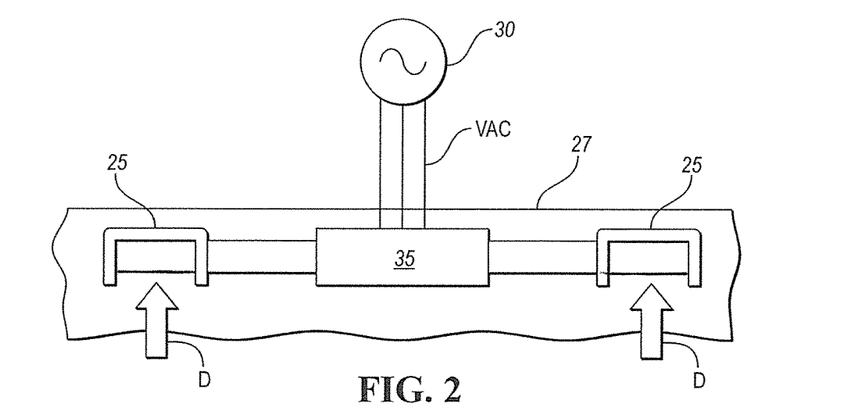
FIG. 2 is a schematic plan view illustration of a charging area and an alternating current power supply used as infrastructure by the conductive charging system of FIG. 1.
Figure 3:
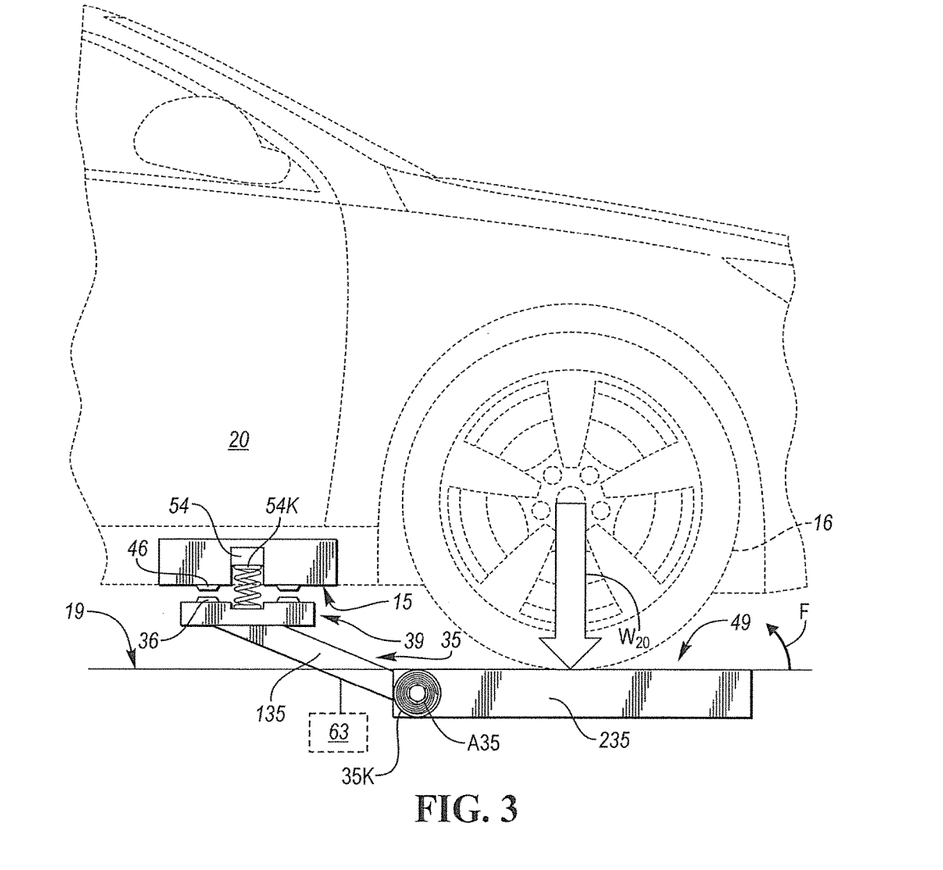
FIG. 3 is a schematic side view illustration of a conductive armature usable as part of the system shown in FIG. 1.

As will be described in detail below, the present disclosure enables "hands free" conductive charging of the battery pack 26 via passive weight-based or force-based control of a conductive armature 35, an example embodiment of which is shown in FIG. 3. Powerflow from the offboard power supply 30, 130 occurs through one of two separate charging paths A and B, with charging path A being a default conventional "plug-in" charging path, and with charging path B being a "hands free" charging path described herein, with the structure shown in FIGS. 2-4 enabling the selection of one of the charging paths A and B. FIG. 5 describes a method 100 that may be used as part of an exit strategy to facilitate termination of an ongoing charging operation of the vehicle 20.

The electric potential of the battery pack 26 shown in FIG. 1 may range from about 60-360 VDC or more depending on the configuration of the vehicle 20. However, for the purposes of the present disclosure, the term "high-voltage" refers generally to a voltage level in excess of typical 12-15 VDC auxiliary voltage levels. The battery pack 26 may be used to energize an electric machine (M) 29 via a power inverter module (PIM) 28, such that the electric machine 29 ultimately produces an output torque (arrow $T_O$) via an output member 32 to propel the vehicle 20 or perform other work.

Auxiliary power aboard the vehicle 20 is supplied in part via an auxiliary battery ($B_{AUX}$) 126 providing an auxiliary voltage $V_{AUX}$, typically 12 VDC. The auxiliary battery 126 in turn may be energized via an auxiliary power module (APM) 31, i.e., a voltage regulator operable for reducing the DC voltage from a level output from the battery pack 26 to a lower auxiliary level suitable for powering auxiliary electrical systems aboard the vehicle 20. The APM 31 and/or the auxiliary battery 126 may serve as auxiliary power supplies as needed within the scope of the present disclosure. As explained below with reference to FIG. 4, the auxiliary battery 126 is also used as part of a charging circuit 60 to help achieve hands-free conductive charging of the battery pack 26.

The conductive charging system 10 shown schematically in FIG. 1 includes a charge coupler 22 and an AC-DC converter 24, with the latter being electrically connected between the charge coupler 22 and the battery pack 26. As will be explained herein with particular reference to FIG. 4, the system 10 is configured to selectively provide one of the two different charging paths A and B between the AC power supply 30 and the AC-DC converter 24, and in this manner to allow hands-free conductive charging of the battery pack 26 to occur at or along an underbody 15 of the vehicle 20. The system 10 specifically provides automatic weight-based automatic AC-DC relaying, which can be achieved via a conductive armature 35 shown in FIG. 3 and the charging circuit 60 of FIG. 4.

As is well understood in the art, an AC-DC converter such as the AC-DC converter 24 of FIG. 1 may include a number of internal electronic components that work in concert to convert a voltage from the AC power supply 30 into a DC voltage output (VDC). Although omitted for illustrative simplicity, such internal structure typically includes electronic elements such as input and output waveform filters, passive diode bridges, semiconductor switches such as MOSFETs or IGBTs, a link capacitor, and a transformer. Of these components, the semiconductor switches have on/off switching states that can be commanded by a controller (C) 50 to turn the AC-DC converter 24 on or off as needed.

Referring briefly to FIG. 1A, an offboard power supply 130 in the form of a DC fast-charging power supply may be used in lieu of the AC power supply shown in FIG. 1. A DC fast-charge coupler 122 replaces the charge coupler 22 of FIG. 1, as is known in the art. An optional HV junction box 124 may be used in place of the AC-DC converter 24 of FIG. 1. Such a junction box 124 contains HV isolation relays (R1) to allow for rapid HV power disconnection when necessary. Thus, DC power from the offboard power supply 130 may be delivered directly to the DC voltage bus and/or the battery pack 26. The remaining structural details of FIG. 1 may be used with the alternative embodiment of FIG. 1A, and therefore such details are omitted from FIG. 1A for simplicity.

The controller 50 of FIG. 1 is also programmed to receive input signals (arrow $CC_I$) and to control the overall charging operation of the vehicle 20 via output signals (arrow $CC_O$) as set forth below. The identity and range of the input signals (arrow $CC_I$) may vary with the particular application, but within the scope of the present disclosure may include a voltage or current of the battery pack 26 and the auxiliary battery 126 or other auxiliary power device, a speed of the vehicle 20, an on/off propulsion state of the vehicle 20, and other typical values such as temperature and state of charge of the battery pack 26. Additionally, the controller 50 is programmed to receive, detect, or otherwise determine a requested park, reverse, neutral, drive, low (PRNDL) state of the vehicle 20, with particular control actions including selectively disabling the AC-DC converter 24 being executed as part of the method 100 described below with reference to FIG. 5.

The controller 50 includes a processor P and memory M. The memory M includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 may be programmed to execute instructions embodying an exit strategy method 100, an example of which is set forth below with reference to FIG. 5.

In operation, the vehicle 20 of FIG. 1 may be driven across a surface 19 toward an alignment barrier 25, e.g., a raised cement or rubber wall, bump, or other suitable fixed stop feature allowing an operator to align front wheels 16 of the vehicle 20 in preparation for deployment of the conductive armature 35. The armature 35 is electrically connected directly to the offboard power supply 30 as shown, and thus receives an AC input voltage (VAC) directly from the offboard power supply 30. The armature 35 is operable for deploying into direct electrical contact with the vehicle 20, such as via a conductive pad 46 (see FIG. 3) located on the underside 15 of the vehicle 20 in response to a weight of the vehicle 20 as best shown by the weight (arrow $W_{20}$) in FIG. 3.

Referring briefly to FIG. 2, the offboard power supply 30 is electrically connected directly to the conductive armature 35 within a designated charging area 27, i.e., a designated section or surface area of a garage floor 19 (see FIG. 1) or other designated charging surface. When the vehicle 20 moves toward the alignment barriers 25 in the direction of arrows D and ultimately reaches the alignment barriers 25, also shown in profile in FIG. 1, rolling contact between the wheels 16 and the conductive armature 35, with a threshold force from the weight of the vehicle 20, causes the armature 35 to deploy into direct electrical contact with the vehicle 20. AC power (VAC) from the offboard power supply 30 or, in the embodiment of FIG. 1A, DC power, is thereafter supplied to the conductive armature 35 as set forth below. Other embodiments may be envisioned within the scope of the disclosure.

For instance, as shown in FIG. 3, the weight (arrow $W_{20}$) of the vehicle 20 may be measured or sensed, with a threshold weight used by an actuator 63 to determine when the vehicle 20 has been properly positioned. The actuator 63 can then move the armature 35 into position. In this manner, the actuator 63 may act as a motorized switch. The charging end 39 and a non-charging end 49 of the conductive armature 35 may be integrally formed with first and second members 135 and 235, respectively, with the ends 39 and 49 or members 135 and 235 of the armature 35 intersecting along a pivot axis $A_{35}$ of the conductive armature 35. The armature 35 may be biased by a spring 35K, e.g., a coil spring, that is arranged along the pivot axis $A_{35}$, such that direct contact between the wheels 16, or more precisely a tire disposed on one of the wheels 16, and/or a threshold force from the weight ($W_{20}$) of the vehicle 20 of FIG. 1, ultimately overcomes a calibrated spring force of the spring 35K. This in turn allows the charging end 39 of the armature 35 to move or deploy upward toward the underside 15 of the vehicle 20.

The charging end 39 may include conductive pads 36, such as one or more plates or pins of copper or another suitable electrical conductor. The conductive pads 36 are configured to come into direct electrical contact with the similarly constructed conductive pads 46 located on the underside 15 of the vehicle 20. A threshold force is required for a spring 54K of the switch 54, shown schematically in FIG. 4, to compress to a degree sufficient for closing the switch 54 and commencing the conductive charging operation. In other embodiments, not shown but readily appreciated by one of ordinary skill in the art, the switch 54 could be located elsewhere on the armature 35.

When charging of the battery pack 26 of FIG. 1 is complete or continued charging is no longer desired, an operator of the vehicle 20 may shift the vehicle 20 into reverse or drive, which is detected as part of normal control architecture and communicated to the controller 50 as part of the input signals (arrow CO. Once other factors have been properly evaluated and the vehicle 20 of FIG. 1 is permitted to move, e.g., using the factors noted in the description of the method 100 shown in FIG. 5, the non-charging end 49 of the conductive armature 35 moves in the direction of arrow F via the return force of the spring 35K or another suitable resilient member. The charging end 39 is thereafter stowed below a level of the floor 19. Other embodiments may be readily envisioned within the intended inventive scope, including a spring-loaded armature 35 that rises vertically in response to weight (arrow $W_{20}$) of the vehicle 20 without rotation about the axis $A_{35}$.

Figure 4:
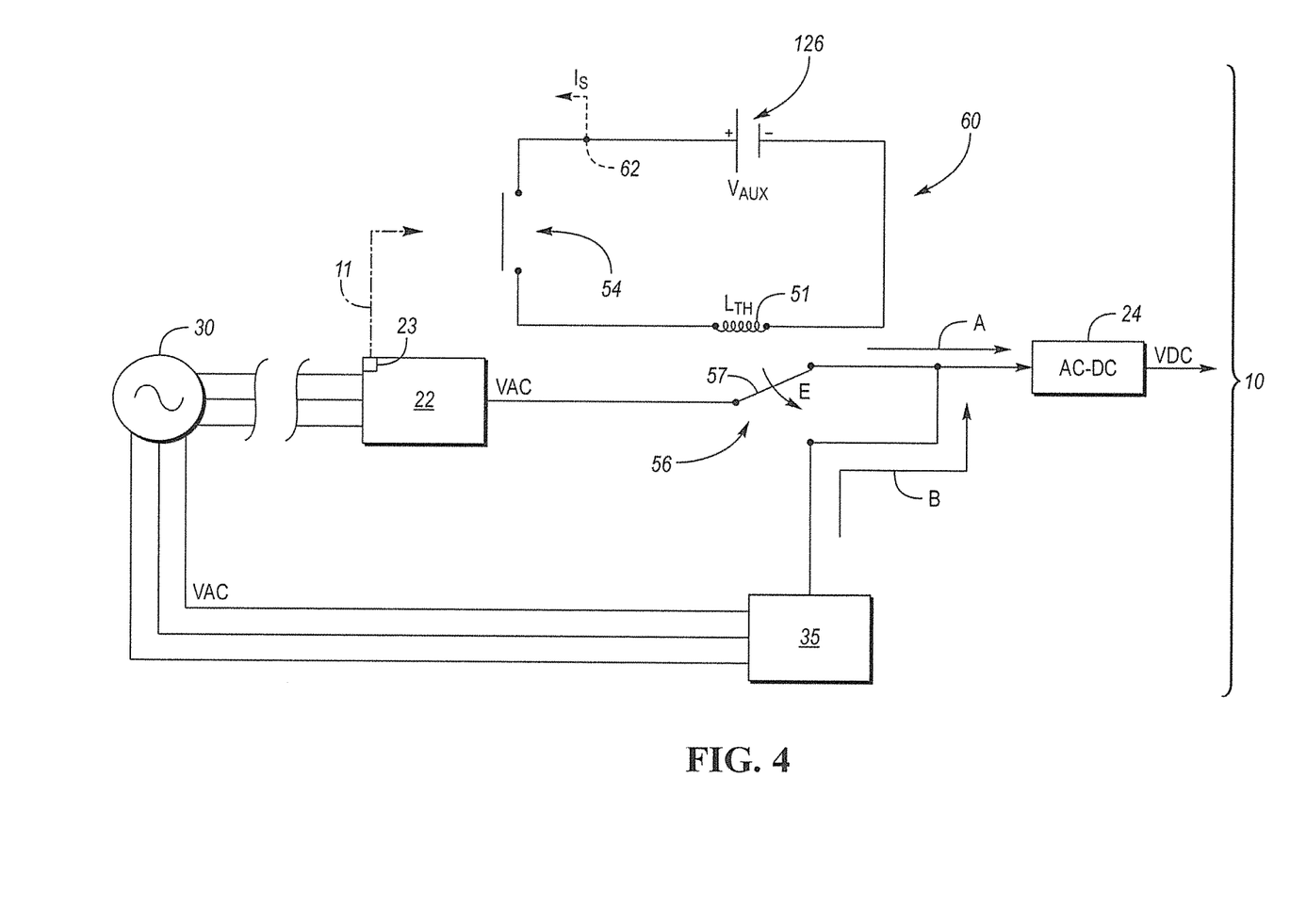
FIG. 4 is a schematic circuit diagram of the conductive charging system shown in FIG. 1.
Figure 5:
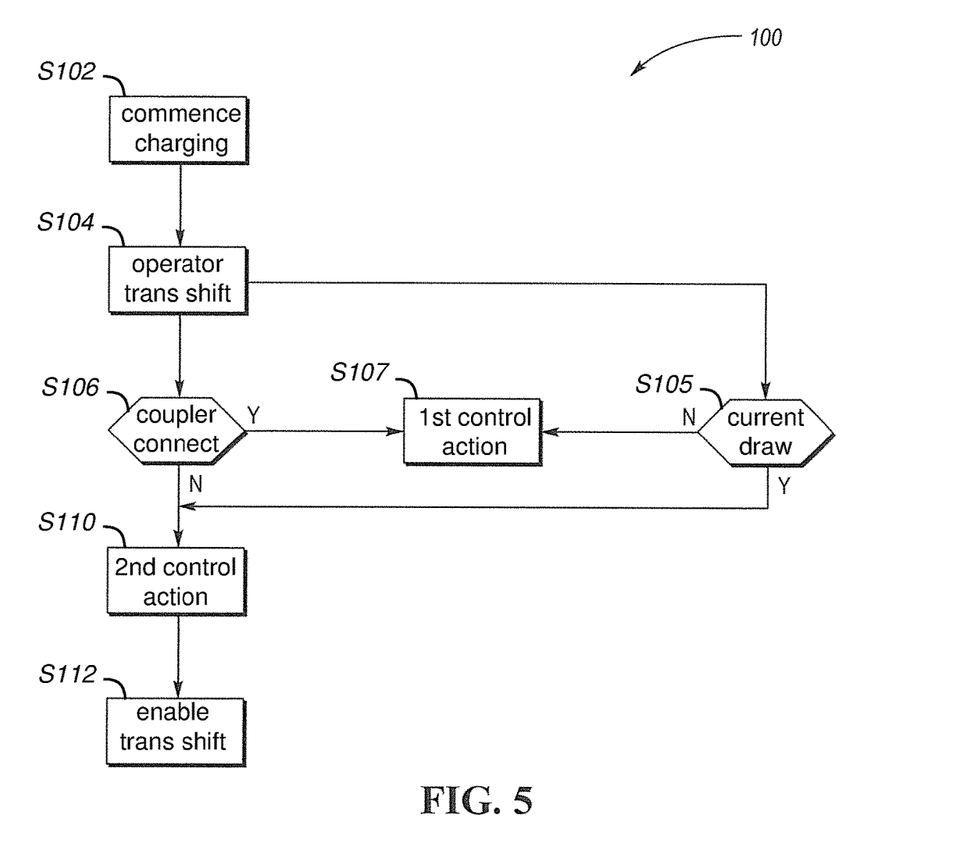
FIG. 5 is a flow chart describing an example method for discontinuing an active charging event using the conductive charging system shown in FIG. 1.

Referring to FIG. 4, the charging circuit 60 noted above may include the auxiliary battery 126 with auxiliary voltage $V_{AUX}$, the switch 54 also shown in FIG. 3, and an electromagnetic relay 56 having an inductive coil 51 and a binary switch 57. The charging circuit 60 may optionally include an electrical sensor 62 positioned between the switch 54 and the auxiliary battery 126 or other auxiliary power device. The electrical sensor 62 is operable for measuring an electrical value, e.g., a current (arrow $I_S$) in the charging circuit 60, particularly between the auxiliary battery 126 and the inductive coil 51, and an additional sensor 23 on or in the charge coupler 22 operable for measuring a connection state (arrow 11) between the charge coupler 22 and the offboard power supply 30, i.e., an electrical connection between a plug (not shown) and the charge coupler 22, as is well known in the art. For instance, proximity signals may be used as part of a standard to verify that the offboard power supply 30 has been electrically connected to the vehicle 20 at the charge coupler 22. The electrical current (arrow $I_S$) and the connection state (arrow 11) may be included in the input signals (arrow CO transmitted to the controller 50 shown in FIG. 1. Alternatively, the current sensor 62 may be embodied as logic circuitry such as a pull-up or pull-down resistive detection circuit within the intended scope of the disclosure.

The switch 54, which may be positioned between a positive terminal of the auxiliary battery 126 and the inductive coil 51, is configured to close when the vehicle 20 moves the armature 35 as explained above. Closure of the switch 54 in response to a threshold force, e.g., the weight (arrow $W_{20}$) of the vehicle 20, electrically connects the auxiliary battery 126 to the inductive coil 51, thereby energizing the inductive coil 51. An inductance $L_{TH}$ is thereafter generated across the inductive coil 51. If the inductance ($L_{TH}$) is sufficiently high relative to a calibrated threshold, the binary switch 57 of the electromagnetic relay 56 moves in the direction of arrow E to establish the charging path B as set forth below.

Further with respect to the structure of the charging circuit 60 of FIG. 4, the electromagnetic relay 56 may be embodied as or include a normally-closed, single-pole double-throw (SPDT) switch or other suitable electromagnetic switch configuration. The binary switch 57 of the electromagnetic relay 56 may have a normally-closed position that is achieved when the first switch 54 is open, i.e., the default "plug-in" charging A. The offboard power supply 30 is indirectly connected to the AC-DC converter 24, or in FIG. 1A, offboard power supply 130 is indirectly connected to the junction box 124, through the intervening structure of the charge coupler 22 (or 122).

The binary switch 57 has another position establishing the separate charging path B, which is achieved when the switch 54 closes and electrical current from the auxiliary battery 126 reaches the inductive coil 51. The inductive coil 51 is thereby energized to enable a "hands-free" charging mode of the battery pack 26 of FIG. 1. As noted above, the electromagnetic relay 56 moves in the direction of arrow E in response to a threshold level of the inductance $L_{TH}$ to thereby directly connect the AC-DC converter 24 to the AC power supply 30. In this manner, charging path B bypasses the AC charge coupler 22 altogether, while charging path A requires a charging current to first pass through the AC charge coupler 22.

Referring to FIG. 5, a method 100 may be executed by the controller 50 of FIG. 1 as part of an exit strategy for terminating a charging operation of the vehicle 20. While FIG. 5 is described with reference to the non-limiting embodiment of FIG. 1, i.e., AC charging, those of ordinary skill in the art will appreciate that modifications to method 100 may be readily made for DC fast-charging as shown in FIG. 1A.

Beginning with step S102, an operator of the vehicle 20 pulls the vehicle 20 into the designated charging area 27 of FIG. 2 and into proximity of the conductive armature 35. As the wheels 16 of the vehicle 20 contact the armature 35, or when the weight of the vehicle 20 exceeds a threshold at a specific location of the charging area 27, the charging end 39 of FIG. 3 rotates or otherwise moves into direct contact with the vehicle 20 as explained above. Hands-free conductive charging operations commence. The method 100 then proceeds to step S104.

Step S104 entails detection by the controller 50 shown in FIG. 1 of an operator shifting a transmission of the vehicle 20 into drive or reverse, e.g., by receiving a position signal from a park, reverse, neutral, drive, low (PRNDL) lever or a PRNDL state from a separate transmission control module, as is well known in the art. The controller 50 may be programmed to determine the requested PRNDL state of the vehicle 20 as part of the input signals (arrow $CC_1$) shown in FIG. 1. The method 100 then proceeds to step S105.

At step S105, the method 100 determines whether the inductive coil 51 of the electromagnetic relay 56 shown in FIG. 4 is actively drawing current from the auxiliary battery 126. For example, the sensor 62 in the charging circuit 60 may measure the current (arrow $I_S$) as part of the input signals (arrow $CC_1$) communicated to the controller 50 of FIG. 1. The method 100 proceeds to step S110 if the inductive coil 51 is drawing the electrical current (arrow $I_S$). The method 100 proceeds to step S107 in the alternative if the inductive coil 51 is not drawing current (arrow $I_S$).

Step S106 includes determining whether the AC charge coupler 22 remains connected to the AC power supply 30. As is well known in the art, a propulsion function of a plug-in vehicle such as the example vehicle 20 of FIG. 1 is prevented when the vehicle 20 remains plugged into the AC power supply 30. The physical connection between a plug of a cable leading from the AC power supply 30 and the AC charge coupler 22 may be detected as part of such fault control, for instance using the sensor 23 of FIG. 3, with the sensor 23 transmitting the connection signal (arrow 11) to the controller 50 as part of the input signals (arrow $CC_1$). The method 100 proceeds to step S107 when the connection is detected, and to step S110 when the connection is not detected, i.e., when the AC power supply 30 is no longer physically connected to the AC charge coupler 22.

Step S107 includes executing a control action via the controller 50 with respect to the vehicle 20, with the control action being indicative of the existing connection between the AC power supply 30 and the AC charge coupler 22. For instance, as part of the output signals (arrow $CC_O$) of FIG. 1, the controller 50 may indicate to an operator of the vehicle 20 that the vehicle 20 remains connected to the AC power supply 30, such as by illuminating a dashboard lamp, transmitting a warning message, or otherwise alerting the operator to the state of the connection. The method 100 then repeats step S105.

At step S110, the method 100 includes executing a control action with respect to a charging operation of the vehicle 20. As part of step S110 the controller 50 may automatically disable the AC-DC converter 24 of FIG. 1 by transmitting the output signals (arrow $CC_O$) to the various semiconductor switches and other controlled switching elements of the AC-DC converter 24. The method 100 then proceeds to step S112.

Step S112 includes enabling execution of the transmission shift initiated at step S104, e.g., by no longer preventing the controller 50 or a separate transmission control module from shifting the transmission into the requested gear state. An operator of the vehicle 20 of FIG. 1 is thereafter able to pull away from the charging area 27 shown in FIG. 1A.

While the best modes for carrying out the disclosure have been described in detail, those familiar with the art to which this disclosure relates will recognize various alternative designs and embodiments for practicing the disclosure within the scope of the appended claims.

The invention claimed is:

1. A conductive charging system for use with an offboard power supply and a vehicle, the vehicle having a charge coupler, an auxiliary power device, and a high-voltage direct current battery pack, the conductive charging system comprising:

a conductive armature having a charging end and a non-charging end, wherein the charging end is electrically connected to the offboard power supply and operable for deploying into direct electrical contact with a conductive pad located on the vehicle in response to a threshold force acting on the non-charging end;

an electromagnetic relay having an inductive coil, which is positioned in electrical series with the auxiliary power device, and a second switch, which is positioned in electrical series with the charge coupler, an AC-DC converter, and the battery pack; and a first switch positioned in electrical series between the auxiliary power device and the inductive coil, wherein the first switch is operable for closing in response to the threshold force to thereby electrically connect the auxiliary power device to the inductive coil, thereby energizing the inductive coil, wherein the second switch is configured to transition between:

a first position connecting the charge coupler to the AC-DC converter and the battery pack to thereby enable "plug-in" charging of the battery pack along a first charging path when the inductive coil is not energized, and a second position bypassing the charge coupler to thereby enable "hands-free" charging of the battery pack along a second charging path, distinct from the first charging path, when the inductive coil is energized.

2. The conductive charging system of claim 1, further comprising the AC-DC converter, wherein the offboard power supply is an AC power supply and the AC-DC converter is electrically connected between the charge coupler and the battery pack.

3. The conductive charging system of claim 1, wherein the second switch of the electromagnetic relay is moved from the first position to the second position via a threshold inductance generated across the inductive coil.

4. The conductive charging system of claim 1, wherein the offboard power supply is a DC power supply, and wherein the first position of the second switch connects the charge coupler to the battery pack.

5. The conductive charging system of claim 1, further comprising a spring configured to bias the charging end away from the vehicle when a weight of the vehicle is removed from the non-charging end of the conductive armature.

6. The conductive charging system of claim 5, wherein the charging and non-charging ends of the conductive armature intersect along a pivot axis of the conductive armature, and wherein the conductive armature pivots about the pivot axis in response to the threshold force.

7. The conductive charging system of claim 1, wherein the first switch is a spring-loaded switch.

8. The conductive charging system of claim 1, further comprising a motorized switch operable to move the charging end of the conductive armature into direct electrical contact with the conductive pad of the vehicle.

9. The conductive charging system of claim 1, wherein the electromagnetic relay is a normally-closed, single-pole, double-throw switch.

10. The conductive charging system of claim 1, further comprising an electrical sensor positioned between the first switch and the auxiliary power device, wherein the electrical sensor is operable to measure an electrical between the auxiliary power device and the inductive coil.

11. The conductive charging system of claim 10, further comprising a controller in communication with the electrical sensor, wherein the controller is programmed to execute a control action with respect to a charging operation of the vehicle using the measured electrical.

12. The conductive charging system of claim 11, further comprising the AC-DC converter electrically connected between the charge coupler and the battery pack, wherein the controller is programmed to determine a requested park, reverse, neutral, drive, low (PRNDL) state of the vehicle, and wherein the control action includes disabling the AC-DC converter when the measured current is non-zero and the requested PRNDL state is reverse or drive.

13. A method for executing a charging operation of a vehicle using an offboard power supply, the vehicle including a charge coupler configured to receive power from the offboard power supply, an auxiliary power device and a high-voltage direct current battery pack, the method comprising:
    providing a conductive charging system having a conductive armature that includes a charging end and a non-charging end, wherein the charging end is electrically connected to the offboard power supply;
    deploying the charging end of the conductive armature into direct electrical contact with a conductive pad located on the vehicle in response to a threshold force acting on the non-charging end, wherein the threshold force is provided by a weight of the vehicle;
    closing a first switch, which is positioned in electrical series between the auxiliary power device and an inductive coil, in response to the threshold force to thereby electrically connect the auxiliary power device to the inductive coil, wherein the inductive coil is positioned in electrical series with the auxiliary power device; and
    moving a second switch, which is positioned in electrical series with the charge coupler, an AC-DC converter, and the battery pack, of an electromagnetic relay having the inductive coil to either of:
    a first position connecting the charge coupler to the AC-DC converter and the battery pack to thereby enable "plug-in" charging of the battery pack along a first charging path when the inductive coil is not energized, and
    a second position bypassing the charge coupler to thereby enable "hands-free" charging of the battery pack along a second charging path, distinct from the first charging path, when the inductive coil is energized, and wherein the second switch is moved from the first position to the second position by a threshold inductance generated across the inductive coil when the first switch is closed.

14. The method of claim 13, further comprising a spring configured to bias the conductive armature, wherein application of the threshold force on the non-charging end of the conductive armature overcomes a calibrated spring force of the spring and thereby allows the charging end to move into contact with of the conductive pad of the vehicle.

15. The method of claim 13, wherein the first switch is a spring-loaded switch.

16. The method of claim 13, wherein the electromagnetic relay is a normally-closed, single-pole, double-throw switch.

17. The method of claim 13, further comprising an electrical sensor positioned between the first switch and the auxiliary power device, wherein the electrical sensor is operable to measure an electrical between the auxiliary power device and the inductive coil.

18. The method of claim 17, further comprising a controller in communication with the electrical sensor, wherein the controller is programmed to execute a control action with respect to a charging operation of the vehicle using the measured electrical.

19. The method of claim 18, wherein the AC-DC converter is electrically connected between the charge coupler and the battery pack, wherein the controller is programmed to determine a requested park, reverse, neutral, drive, low (PRNDL) state of the vehicle, and wherein the control action includes disabling the AC-DC converter when the measured current is non-zero and the requested PRNDL state is reverse or drive.

20. The method of claim 13, wherein the battery pack is a multi-cell lithium-ion battery module and the auxiliary power device is a 12 VDC auxiliary battery.

* * * * *

UNITED STATES PATENT AND TRADEMARK OFFICE
CERTIFICATE OF CORRECTION

PATENT NO. : 10,286,799 B2
APPLICATION NO. : 15/244573
DATED : May 14, 2019
INVENTOR(S) : Andrew J. Namou et al.

Page 1 of 1

It is certified that error appears in the above-identified patent and that said Letters Patent is hereby corrected as shown below:

In the Claims

Column 9, Line 34, in Claim 10, "an electrical between" should read --an electrical current between--
Column 9, Line 40, in Claim 11, "the measured electrical." should read --the measured electrical current.--
Column 10, Line 40, in Claim 17, "an electrical between" should read --an electrical current between--
Column 10, Line 46, in Claim 18, "the measured electrical." should read --the measured electrical current.--

Signed and Sealed this
Twenty-seventh Day of August, 2019

Andrei Iancu
*Director of the United States Patent and Trademark Office*